United States Patent
Koenig

(10) Patent No.: US 8,140,198 B1
(45) Date of Patent: Mar. 20, 2012

(54) SLEW GUIDANCE METHOD FOR SPACECRAFT

(75) Inventor: Jesse D. Koenig, San Diego, CA (US)

(73) Assignee: Spacedev, Inc., Poway, CA (US)

( * ) Notice: Subject to any disclaimer, the term of this patent is extended or adjusted under 35 U.S.C. 154(b) by 1201 days.

(21) Appl. No.: 11/934,538

(22) Filed: Nov. 2, 2007

Related U.S. Application Data

(60) Provisional application No. 60/856,535, filed on Nov. 2, 2006.

(51) Int. Cl.
*G01C 23/00* (2006.01)
*B64G 1/14* (2006.01)
(52) U.S. Cl. .............................. 701/13; 701/3; 244/158.1
(58) Field of Classification Search ............... 701/1, 3–5, 701/8, 13; 244/158.1, 164
See application file for complete search history.

(56) References Cited

U.S. PATENT DOCUMENTS 6,138,953 A * 10/2000 Noyola et al. ................. 244/165

* cited by examiner

*Primary Examiner* — Yonel Beaulieu
(74) *Attorney, Agent, or Firm* — Fred C. Hernandez; Mintz, Levin, Cohn, Ferris, Glovsky and Popeo, P.C.

(57) ABSTRACT

A method is adapted for slewing a body from an initial state to merge with a desired state profile. In an embodiment, the method includes the steps of (a) obtaining data indicative of a time profile of desired future states for the body; (b) searching sequentially through the time profile of desired future states; (c) calculating several slews for the body from the initial state to each of the desired future states; (d) determining the earliest future state to which the body can actually slew; (e) choosing the minimum-energy slew to that state; and (f) causing the body to perform that chosen slew.

9 Claims, 3 Drawing Sheets

SLEW GUIDANCE METHOD FOR SPACECRAFT

REFERENCE TO PRIORITY DOCUMENT

This application claims priority of U.S. Provisional Patent Application Ser. No. 60/856,535, filed Nov. 2, 2006. Priority of the aforementioned filing date is hereby claimed and the disclosure of the Provisional patent application is hereby incorporated by reference in its entirety.

BACKGROUND

The present disclosure relates to a method for slewing a body from an initial state to merge with a desired state profile. In particular, the present disclosure relates to slewing a spacecraft.

It is often necessary to reorient, or slew, a moving body from a first state to merge with a time profile of desired future states, where a state is defined as a combination of the body's attitude (3 dimensional angular orientation), and the rates of change of the attitude (3 dimensional angular velocities). For example, a spacecraft or some other body in space, air, water or on land may need to be reoriented so as to track one or more objects, such as missiles, that are moving relative to the body, where tracking is defined as pointing a body vector (such as the boresight of a sensing instrument) at the object. Also, when tracking is finished, the spacecraft may need to be reoriented to a different state determined by any of a variety of operational goals. It is important to note that the desired state depends upon the time when the state is achieved, hence the reference to a time profile of desired states, rather than just a single desired state.

In many situations, it is desirable to slew the spacecraft in a manner that is optimized both from the standpoint of the amount of time that it takes as well as from the standpoint of energy usage. For example, it can be desirable to perform the slew in a manner that minimizes both time and energy usage. Furthermore, it is desirable to formulate a slew that may be performed smoothly and stably by the spacecraft. Such a slew must conform to certain angular rate and acceleration limits.

To perform a slew, a spacecraft processor generates attitude commands, which are fed into an attitude control system (ACS). An attitude determination system (ADS) uses sensors and software methods to estimate the spacecraft's current actual attitude. The ACS uses actuators, for example reaction wheels, along with software methods to provide torques that keep the estimated attitude as close as possible to the commanded attitude. As mentioned, the ability to optimize time and energy usage during the slew is highly desirable, as is the ability to provide attitude commands that the ACS can follow without lag, oscillation, or instability. Improved control of this process can provide an increase in maneuver performance and accuracy, as well as energy efficiency.

SUMMARY

Thus, there exists a need for improved methods and devices for generating the attitude commands to perform a slew from an initial state to merge with a desired state profile.

In one aspect, there is disclosed a method for slewing a body from an initial state to merge with a desired state profile. The method includes the steps of (a) obtaining data indicative of a time profile of desired future states for the body; (b) searching sequentially through the time profile of desired future states; (c) calculating several slews for the body from the initial state to each of the desired future states; (d) determining the earliest future state to which the body can actually slew; (e) choosing the minimum-energy slew to that state; and (f) causing the body to perform that chosen slew.

Other features and advantages will be apparent from the following description of various methods and will illustrate, by way of example, the principles of the disclosed invention.

DETAILED DESCRIPTION

While the present systems and methods are described with respect to a spacecraft, the systems and methods may be adapted to be used in various applications known in the art, including both military and civilian applications. The systems and methods described herein are not limited for usage with spacecrafts, but can rather be used in connection with any device that must be guided to certain desired attitude and rate states, including submarines, aircraft, drones, etc. In addition, the systems and methods described herein may be applied to aerospace systems, telecommunication systems, intelligent transportation systems, global positioning systems, and other systems known in the art.

Disclosed are systems and methods for developing a slew profile of attitude (orientation) commands to smoothly reorient a spacecraft from an initial attitude and angular rate to a desired attitude and angular rate, such as to track a target trajectory. The systems and methods are adapted to perform the slew within an optimal time period such as a minimum time, and within an optimal use of energy such as a minimum energy, as well as within certain rate and acceleration limits and without any attitude or rate discontinuities during the slew, or in the transitions between the slew and the initial and final states. The systems and methods may be implemented pursuant to at least two implementations, including desired state profiles consisting of 2-axis attitudes and rates (such as for some applications of target pointing, where there is a degree of freedom about the instrument boresight axis), or fully constrained 3-axis attitudes and rates, both of which are described below.

Figure 1:
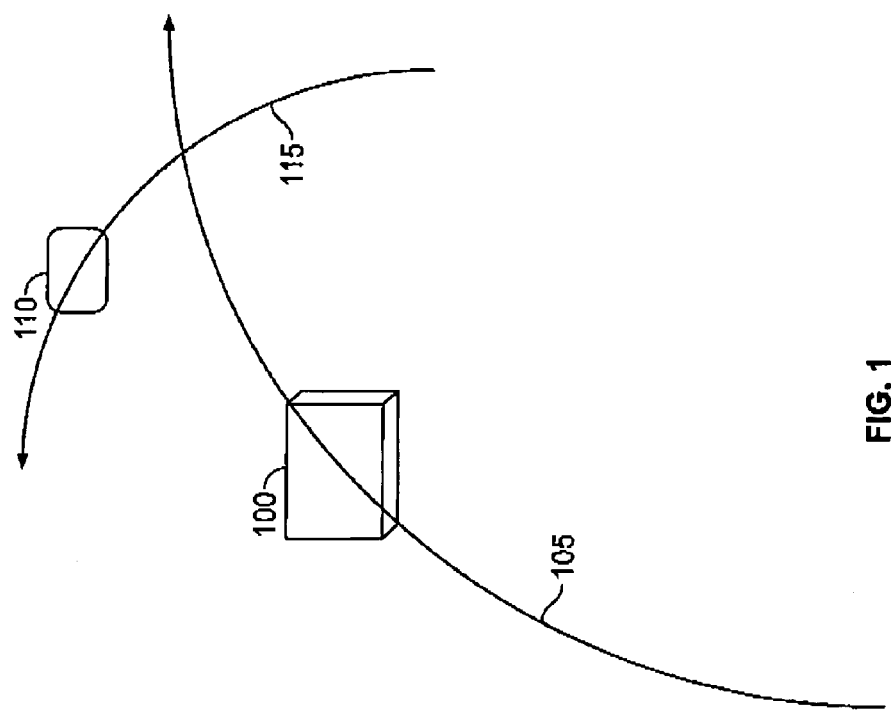
FIG. 1 shows a vector and schematic view of a spacecraft, and a target to be tracked by that spacecraft.

FIG. 1 shows a vector and schematic view of a spacecraft and a target to be tracked. The spacecraft 100 is shown moving along a trajectory, such as an orbit 105, relative to a celestial body. A moving target 110 to be tracked is also moving along a trajectory 115 relative to the spacecraft 100. The spacecraft 100 has a sensing instrument with a boresight axis. Pursuant to one aspect of the invention, the spacecraft 100 is slewed so as to reorient the boresight axis to track the target trajectory 115, that is, to continuously point the boresight at the target. The slew includes adjustment of the spacecraft's attitude and angular rate from an initial state to some state on a desired state profile that corresponds to the boresight tracking the target along its trajectory.

As mentioned, although described in the context of a spacecraft 100, it should be appreciated that the disclosed systems and methods can be adapted for use with other devices that employ tracking of moving targets, or more generally, which require attitude guidance. Thus, the present invention is not limited to use with spacecrafts. For clarity of illustration, the structural details of the spacecraft 100 and of the target 110 are not shown in FIG. 1. It should be appreciated that the spacecraft 100 and the target 110 can have various structural configurations.

Figure 2:
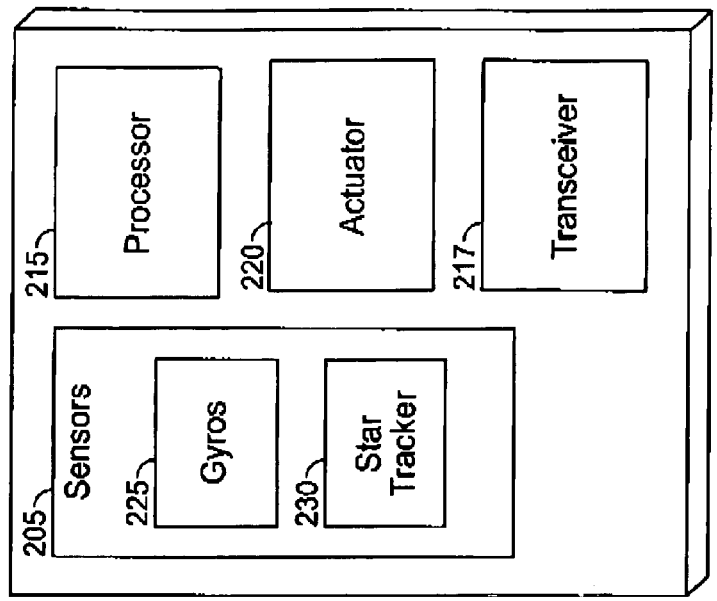
FIG. 2 shows a schematic view of an exemplary spacecraft.

FIG. 2 shows a schematic view of the spacecraft 100, which may include various electronic and software components. The components described in FIG. 2 are for example only and it should be appreciated that the spacecraft 100 is not limited to the configuration shown in FIG. 2. The spacecraft 100 may include multiple sensors 205 for the estimation of the attitude and rates of the spacecraft 100. The desired state profile may be determined and generated by a main processor 215, or received from another spacecraft or ground stations via a transceiver 217. The spacecraft includes the processor 215 that performs the slew method, generating a time profile of attitude commands, which spans the period from the time of the initial state to the time when the spacecraft achieves a state on the desired state profile. The ADS estimates the current state using software methods combined with signals received from the sensors 205. The ACS keeps the estimated states as close as possible to the commanded states by using software methods to generate a torque signal which is received by a control actuator 220, which in turn provides the torques and thus accelerations to effect the slew of the spacecraft 100.

The sensors 205 may include gyros 225, star trackers 230, or other sensors known in the art for the estimation and determination of the attitude of the spacecraft 100. Any quantity of each of the sensors 205 may be utilized. The processor 215 may be microprocessor-based such as a computer having a central processing unit, memory (RAM and/or ROM), and associated input and output buses. The processor 215 may be an application-specific integrated circuit or may be formed of other logic devices known in the art. The processor 215 may be a portion of a central control unit or may be a stand-alone processor, as shown. The aforementioned software methods may reside on the processor 215; these methods include those for the ADS and the ACS, as well as the slew method disclosed herein, and other attitude guidance methods.

The control actuator 220 is generally a torque-generating device and may be in various forms. The control actuator 220 may include multiple thrusters, reaction wheels, control moment gyros, magnets, some combination of these, or may be in some other form known in the art.

Figure 3:
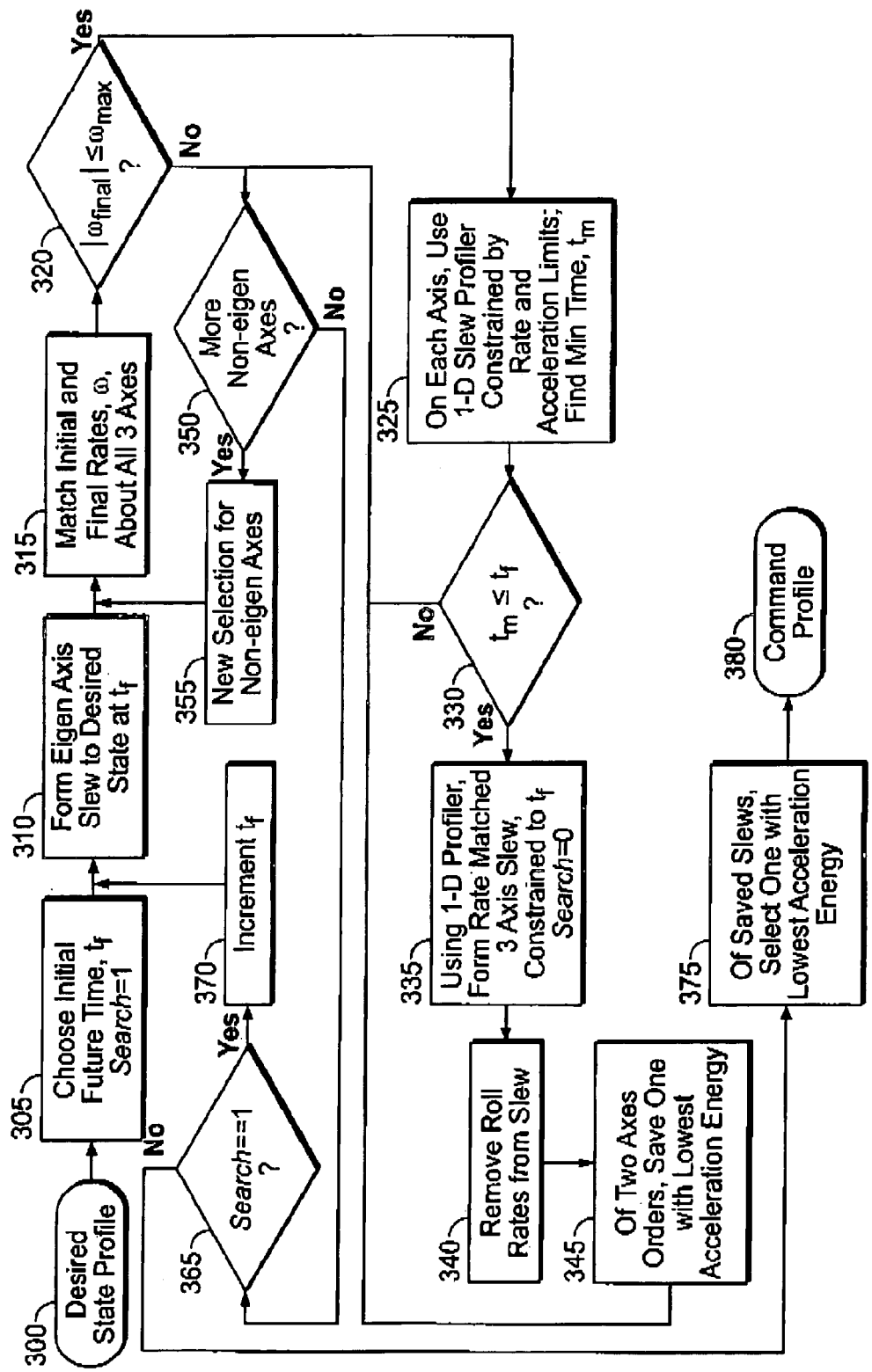
FIG. 3 shows a flow diagram illustrating a method of generating the attitude commands to perform a slew of a spacecraft.

With reference now to FIG. 3, a flow diagram illustrating a method of slewing the spacecraft is shown. Dynamic constraints of the spacecraft are taken to be known. Such constraints include a maximum allowable per-axis angular rate and a maximum allowable per-axis acceleration. These constraints may be determined, for example, by constraints in the mechanical and software components of the spacecraft.

With reference to FIG. 3, in the first step 300, a desired state profile is obtained, calculated from data that is uploaded from other spacecraft or ground stations via transceiver 217, data that already resides in the spacecraft's memory, or some combination thereof. For example, the spacecraft could have a position and translational rate profile for itself stored in memory, then receive from another source a position and translational rate profile for a target to be tracked, and from these data calculate a desired attitude and angular rate profile to track the target.

The method searches sequentially through the future desired states, calculating slews to each, until it finds one for which the slew can be completed before the time of the associated desired state, as described in detail below. If it is known for a particular system that the time required to slew to a desired state increases monotonically with the time of the future state, then a special case of the slew method may be implemented, wherein it searches in a convergent, rather than a sequential manner. This reduces the number of required operations.

Pursuant to subsequent steps described below, a profile of delta quaternions is calculated that represents the rotations of the spacecraft from its initial attitude to the attitudes contained in the desired state profile. In the case of the 2-axis desired states (e.g. for target tracking), the delta quaternions represent the most direct rotation from the initial attitude to the desired boresight pointing.

With reference still to FIG. 3, in step 305 an initial future time Tf is chosen. Tf should be small enough so that there is confidence that it is less than the minimum possible time to complete a slew that arrives on the desired state profile. Pursuant to one aspect of the invention, it will be determined in subsequent steps whether the spacecraft can, within the time Tf, successfully slew to the state corresponding to Tf in the desired state profile. If not, the time Tf is successively increased by a predetermined time increment until a time period is obtained in which a slew to the corresponding desired state can be successfully performed by the spacecraft.

At step 305, the variable search is equal to 1.

In the next step 310, the delta quaternion corresponding to Tf is taken. The delta quaternion represents a rotation by a certain angle about a particular body axis. This axis is referred to as the Eigen axis of the rotation. Once the Eigen axis has been determined, two other body axes are chosen so as to form an orthogonal set with the Eigen axis. There is a degree of freedom in choosing these two additional axes. Axes at intervals about this degree of freedom are tested for optimal performance, as described subsequently.

In the next step 315, the initial rates about each of the three defined body axes are calculated for the initial state, and final rates are calculated for the desired state at Tf. In addition to performing the rotation described by the delta quaternion, the slew must transition the spacecraft from its initial rates to its final rates about all three axes.

In decision step 320, the final rates are compared to the rate limit. If the absolute value of all of the three final rates is less than or equal to the rate limit, the method goes to step 325. Otherwise it goes to decision step 350.

In step 325, three one-dimensional (1D) slews are calculated—one for each of the three defined axes. The 1D slews are calculated by a 1D slew profiler function, which takes as its inputs: a time T1D, the predefined per-axis rate and acceleration limits, the initial rate about the relevant body axis, the final rate about the relevant body axis, and the angle to be traversed about the relevant body axis. (Since the entire rotation from the initial to the final states is performed about the Eigen axis, the other two axes will always have zero angle to be traversed.) The function then calculates a 1D slew that starts at the initial rate and proceeds with a period of constant acceleration, followed by a period of zero acceleration (constant rate), followed by another period of constant acceleration of the same magnitude and opposite direction as the acceleration in the first period, and ends at the final rate. The duration of the constant rate period may be zero, such that the slew effectively has only two discreet periods, each containing constant acceleration.

If the input T1D is left empty, the 1D slew profiler function will calculate the fastest possible (minimum time) slew that satisfies the remainder of the inputs. If a value is specified for T1D, the function will calculate a slew of duration T1D that satisfies the remainder of the inputs, if possible. If T1D is specified as a value less than the minimum time that would be calculated if T1D were left empty, there will not exist a slew that satisfies all the inputs, in which case the function will return a message to this effect; however, the slew method has been constructed such that this case never arises. If T1D is specified as a value greater than the minimum time that would be calculated if T1D were left empty, the function will calculate a 1D slew that satisfies all of the inputs with the minimum possible acceleration magnitude for the periods of constant acceleration. Lower acceleration magnitudes lead to better ACS performance, as well as easier acquisition of targets by sensing instruments.

In step 325, the three 1D slews are calculated with T1D left empty, such that minimum-time slews are returned. The maximum of the total times for the three 1D slews is the minimum time, Tm, in which a 3D slew could be performed from the initial state to the desired state at Tf.

In decision step 330, Tm is compared to Tf. If Tm is less than or equal to Tf, then a 3D slew is feasible with the currently chosen Tf and defined body axes, and the method goes on to step 335. Otherwise it goes to decision step 350.

In step 335, the 1D slew profiler function is again run for each of the 3 defined body axes, and this time T1D is set to Tf for all three axes. It is already known that Tf is greater than or equal to Tm, and therefore, the function will be able to calculate a 1D slew that satisfies all inputs for each of the three axes. From each of the 1D slews, a set of delta angles is calculated. There is a particular command rate at which the attitude commands are given to the ACS. This determines the number of attitude commands that are eventually given by the slew method, and also the number of delta angles that are calculated in step 335. For example, if Tf is 100 seconds, and the command rate is 10 Hz, there will be 1000 attitude commands output by the slew method, and 1000 delta angles calculated per axis in step 335. Each delta angle represents the difference between the initial angular position of the spacecraft about the relevant body axis, and the angular position about that axis at the time step corresponding to the delta angle.

Three sets of delta quaternions are formed with each of the three defined body axes and their respective delta angles. At each time step, a 3D attitude is formed by successively applying each of the three corresponding delta quaternions to the initial attitude. A 3D slew is formed from the time profile of these 3D attitudes. So that the rate at the end of the slew matches the desired rate at Tf, the delta quaternions representing the rotations about the Eigen axis must be applied first since the Eigen axis is the one about which there is a non-zero net angle to be traversed during the slew. So at each time step, the Eigen axis delta quaternion is applied to the initial quaternion, and then both of the other two delta quaternions, one from each of the other two axes, is applied subsequently. While the Eigen axis delta quaternions must be applied first, the other two sets may be applied in either order, i.e. Eigen axis—axis 2—axis 3, or Eigen axis—axis 3—axis 2. These two orders result in two different 3D slews, both of which are viable.

In step 335, the variable search is set to 0.

Step 340 is only applied in the case of 2-axis desired states, as in target tracking, or instrument pointing applications. In these cases, there is one degree of freedom, e.g. about the instrument boresight, which may be called the roll axis. In step 340, the two 3D slews from step 335 are reformulated to remove all angular motion about this axis. The resulting 3D slews will have the exact same pointing profile as the originals for the roll axis, but the rotations will all be direct ones, that is, rotations about body axes perpendicular to the roll axis, giving zero angular rate about the roll axis throughout the slews. Other methods outside the slew method may specify the use of this degree of freedom, but for purposes of calculating accelerations in steps 345 and 375, no knowledge of these methods is assumed, and therefore zero roll motion is chosen as the most general assumption. In the case of 3-axis desired states, step 340 is skipped, and the full 3D slews as produced in step 335 are passed to step 345.

The slew method may be configured to optimize various parameters of the slew. In the configuration described herein, the highest priority is to minimize the time duration of the slew and the secondary priority is to minimize the actuation energy needed for the slew. The slew method may be configured to optimize other parameters and/or to optimize more than two parameters.

In step 345, a selection is made from among the two 3D slews calculated in step 340 (or step 335 in the case of 3-axis desired states). Since both of the axes orders used in step 335 result in viable slews with identical time durations, the selection is made based on the approximated actuation energy. In the case of a spacecraft actuated by reaction wheels, the actuation energy is nearly proportional to the integrated acceleration squared over the span of the slew. The 3-axis acceleration profile may be calculated from the quaternion profile of the slew. At each time step in the slew, there are then three acceleration values—one for each axis—which form a 3D acceleration vector. Each of these values is squared, and all the resulting values over the time span of the slew are summed. This is equivalent to summing the squares of the magnitudes of the 3D acceleration vectors. The accelerations cannot be derived from the individual 1D slew profiles, but rather must be derived from the 3D slew profile. However, it is inconsequential which axes are used in expressing the acceleration vectors.

It is possible to do a simulation of a particular slew to estimate actuation energy, accounting for kinematics, vehicle dynamics, actuator characteristics, and ACS methods. However, this entails much more computation than calculating the integrated acceleration squared. Because the integrated acceleration squared is nearly proportional to the actuation energy for reaction wheels, it may be used for the sake of computational efficiency, as the quantity to minimize.

In step 345, of the two 3D slews that were calculated in step 340 (or step 335 in the case of 3-axis desired states), one is selected that has the lower integrated acceleration squared. This slew is saved to be compared to others in step 375.

As mentioned in step 310, two body axes must be chosen to form an orthogonal set with the Eigen axis. There is a degree of freedom in this choice, and therefore there are infinite sets of two non-Eigen axes that may be used with the Eigen axis, which itself is fixed. A parameter of the slew method is the number of these sets to test. The greater the number of sets tested, the greater the potential performance of the slew (e.g. lower time duration and lower actuation energy), but the higher the amount of required computation, and vice versa. The number of non-Eigen axes sets to test is set by the user, and then the method picks sets that are evenly distributed about the degree of freedom.

Decision step 350 ascertains whether there are more sets of non-Eigen axes to be tested. If there are, the method goes on to step 355. Otherwise it goes to decision step 365.

Step 355 selects the next set of non-Eigen axes to test, and directs the method back to step 315.

Decision step 365 checks whether the variable search is still set to 1. If so, the method goes to step 370. If not, it goes to step 375.

If the method reaches step 370, it indicates that it has not yet found a slew that can be completed within Tf, and that all sets of non-Eigen axes to be tested have been tested. Therefore, Tf must be increased to find a viable slew. Step 370 increases Tf by a certain increment which is a parameter of the slew method to be set by the user. Smaller increments give finer resolution on the time duration of the slew, potentially decreasing the time duration, but increase the required computation, and vice versa. After Tf has been incremented in step 370, the method is directed back to step 310.

If the method reaches step 375, it indicates that at least one viable slew has been found (so that search is set to 0), and that all sets of non-Eigen axes to be tested have been tested. Thus, Tf will not be further incremented. If, for the chosen value of Tf, there was only one set of non-Eigen axes that produced a viable slew, then this is the final output of the method. However, if there was more than one set of non-Eigen axes that produced viable slews, then for each of these sets, one 3D slew was saved in an instance of step 345. Then in step 375, a slew is selected from among the ones saved in the multiple instances of step 345, that has the lowest integrated acceleration squared, as described for step 345. This is then the final slew.

In step 380, the final slew is output as a time profile of attitude commands.

Figure 4:
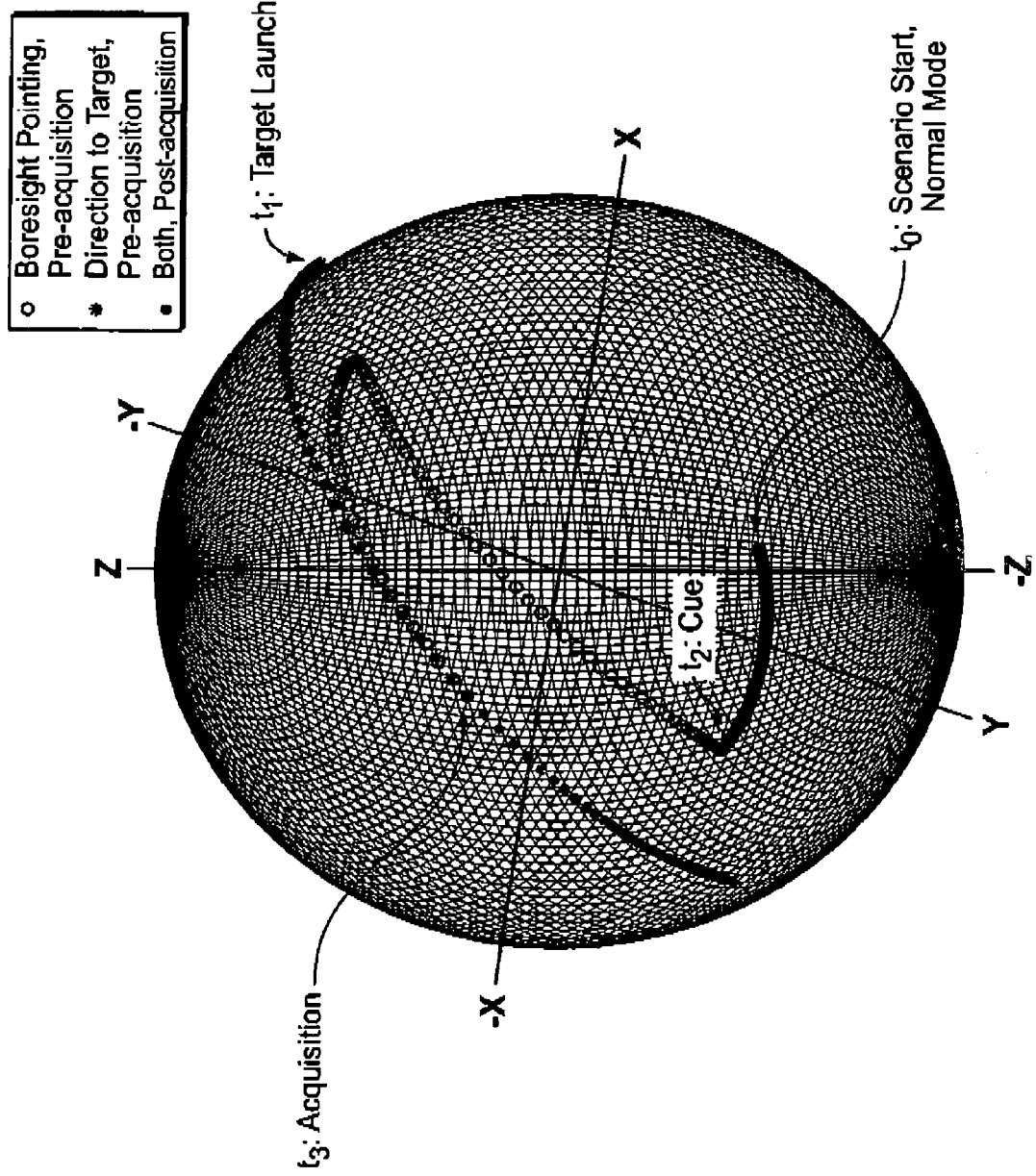
FIG. 4 shows a representation of a particular simulated slew.

FIG. 4 shows a visual representation of a scenario where the aforementioned slew process is performed, for the target tracking case—that is, with 2-axis desired states. The sphere in the illustration represents an attitude sphere. The spacecraft (or other body) is located at the center of the sphere. The markers (asterisks, and open and closed circles) on the surface of the sphere represent various pointing directions of a certain body axis, in this case an instrument boresight, showing where the axis would intersect the sphere given a particular spacecraft attitude.

At initial time $t_0$, the scenario begins. The slew method has not yet been initiated, and the spacecraft state is determined by other methods. The span of open circles (○) that commences at $t_0$ represents the spacecraft's actual boresight pointing directions while the instrument is not tracking a target. The markers on the attitude sphere show boresight pointing directions, either actual or hypothetical, all at constant time intervals. Thus, relative angular rates may be inferred from the spacing of the markers—when they are closer together the rates are lower, and vice versa.

At time $t_1$, the target commences its trajectory. As mentioned, the target can be, for example, a missile that is launched from a location on a planet. It should be appreciated that the target can be any other object that moves along a trajectory. The span of asterisks (*) that commences at $t_1$ represents the hypothetical boresight pointing directions to track the target during the time period in which the spacecraft instrument is not actually tracking the target.

At time $t_2$, the spacecraft is cued with data that is descriptive of the target trajectory. This data is combined with data describing the spacecraft trajectory, and the data for both trajectories are used to calculate a desired state profile of 2-axis attitudes and rates, i.e. a desired profile of boresight pointing directions and cross-boresight angular rates, that correspond to target tracking. After the desired state profile has been generated, the slew method is executed. The slew method generates a profile of attitude commands which are fed to the ACS to effect the desired slew. Between $t_2$ and $t_3$, the spacecraft follows the slew that was generated by the slew method. At time $t_3$, the slew is complete, the spacecraft has arrived at one of the states in the desired state profile, and thus the instrument is tracking the target.

The span of closed circles (●) that commences at $t_3$ represents the actual boresight pointing directions while the spacecraft is tracking the target, showing that the spacecraft's actual state profile has merged with the desired state profile.

A number of embodiments of the invention have been described. Never-the-less, it will be understood that various modifications may be made without departing from the spirit and scope of the invention. Accordingly, other embodiments are within the scope of the invention.

What is claimed:

1. A method for slewing a body from an initial state to merge with a desired state profile, comprising:
   obtaining data indicative of a time profile of desired future states for the body;
   searching sequentially through the time profile of desired future states;
   calculating a slew for the body from the initial state to each of the desired future states;
   calculating an initial future time;
   determining whether the body can slew to the desired state profile within a sufficient amount of time such that the desired state profile can be achieved by the initial future time;
   if the body cannot slew to the desired state profile within a sufficient amount of time such that the desired state profile can be achieved by the initial future time, then recalculating a new slew for the body that will achieve the desired state profile by the initial future time; and
   causing the body to slew pursuant to the newly calculated slew.

2. A method as in claim 1, wherein the body is a spacecraft.

3. A method as in claim 1, wherein the state profile includes angular attitude and angular rates.

4. A method as in claim 1, wherein data indicative of a time profile of desired future states is uploaded from a spacecraft or a ground station.

5. A method as in claim 1, wherein data indicative of a time profile of desired future states resides in a local memory.

6. A method as in claim 1, wherein a state profile includes 2-axis attitudes and rates.

7. A method as in claim 1, wherein a state profile includes fully constrained 3-axis attitudes and rates.

8. A method as in claim 1, wherein there is a secondary parameter to be optimized after slew duration.

9. A method as in claim 8, wherein the secondary parameter to be optimized after slew duration comprises slew actuation energy to be minimized.

* * * * *